United States Patent
Someya et al.

(10) Patent No.: US 9,503,920 B2
(45) Date of Patent: Nov. 22, 2016

(54) BASE STATION AND COMMUNICATION SYSTEM TO RESTRICT COMMUNICATION SERVICE

(71) Applicant: NTT DOCOMO, INC., Tokyo (JP)

(72) Inventors: Takao Someya, Tokyo (JP); Fumiki Hasegawa, Tokyo (JP);
(Continued)

(73) Assignee: NTT DOCOMO, INC., Tokyo (JP)

( * ) Notice: Subject to any disclaimer, the term of this patent is extended or adjusted under 35 U.S.C. 154(b) by 38 days.

(21) Appl. No.: 14/125,796

(22) PCT Filed: Oct. 16, 2012

(86) PCT No.: PCT/JP2012/076713
§ 371 (c)(1),
(2) Date: Dec. 12, 2013

(87) PCT Pub. No.: WO2013/061827
PCT Pub. Date: May 2, 2013

(65) Prior Publication Data
US 2014/0295823 A1     Oct. 2, 2014

(30) Foreign Application Priority Data
Oct. 24, 2011    (JP) .................................. 2011-232649

(51) Int. Cl.
*H04L 12/28*     (2006.01)
*H04L 12/56*     (2006.01)
(Continued)

(52) U.S. Cl.
CPC ............. *H04W 24/04* (2013.01); *H04W 88/10* (2013.01); *H04W 84/045* (2013.01)

(58) Field of Classification Search
CPC ............... H04L 1/22; H04L 41/0654–41/0672; H04L 43/0805–43/0817; H04L
(Continued)

(56) References Cited

U.S. PATENT DOCUMENTS

2008/0130555 A1*   6/2008   Kalhan .................. 370/329
2008/0304831 A1*   12/2008   Miller, II ........... H04B 10/1125
                                               398/115
(Continued)

FOREIGN PATENT DOCUMENTS

CN         101977417 A   *   2/2011
JP         2011-19149 A     1/2011
(Continued)

OTHER PUBLICATIONS

International Search Report for corresponding International Application No. PCT/JP2012/076713, mailed Nov. 27, 2012 (2 pages).
(Continued)

*Primary Examiner* — Rafael Pérez-Gutiérrez
*Assistant Examiner* — Mark G. Pannell
(74) *Attorney, Agent, or Firm* — Osha Liang LLP

(57) ABSTRACT

A base station has a first wireless communication unit that communicates with mobile stations for offering a first radio communication service to the mobile stations, and a second wireless communication unit that communicates with mobile stations for offering a second radio communication service that is different from the first radio communication service to the mobile stations. At the base station, a communication service continuation restrictor is provided that restricts operation of the base station as to whether or not, when it is detected that either one of the first or the second radio communication service is not executable, another radio communication service should be continued. Whether or not the other communication service should be continued can be set at the communication service continuation restrictor.

5 Claims, 7 Drawing Sheets

(72) Inventors: Takefumi Yamada, Tokyo (JP); Hiroki Zukawa, Tokyo (JP); Yutaka Fuke, Tokyo (JP); Toshirou Kawahara, Tokyo (JP)

(51) Int. Cl.
*H04L 12/43* (2006.01)
*H04W 24/04* (2009.01)
*H04W 88/10* (2009.01)
*H04W 84/04* (2009.01)

(58) Field of Classification Search
CPC ............ 49/55–49/557;H04L 69/40; H04W 24/00; H04W 24/08; H04W 36/06; H04W 36/08; H04W 36/14; H04W 36/34; H04W 36/38; H04W 36/385; H04W 48/18; H04W 60/04; H04W 76/028; H04W 88/10
USPC ............ 370/216–228, 241, 242, 245, 331; 455/115.1, 423–424, 436–444, 455/450–454, 552.1–553.1
See application file for complete search history.

(56) References Cited

U.S. PATENT DOCUMENTS

| | | | | |
|---|---|---|---|---|
| 2008/0316952 | A1* | 12/2008 | Gruber et al. | 370/312 |
| 2009/0059875 | A1* | 3/2009 | Matthews | H04W 24/06 370/338 |
| 2009/0275325 | A1* | 11/2009 | Davis | 455/422.1 |
| 2010/0120394 | A1* | 5/2010 | Mia | H04W 64/003 455/404.2 |
| 2010/0130147 | A1* | 5/2010 | Kanda et al. | 455/138 |
| 2010/0169498 | A1 | 7/2010 | Palanki et al. | |
| 2010/0273468 | A1 | 10/2010 | Bienas et al. | |
| 2011/0116629 | A1* | 5/2011 | Forsberg | H04L 9/083 380/44 |
| 2011/0261683 | A1* | 10/2011 | Nitta et al. | 370/225 |
| 2011/0281586 | A1* | 11/2011 | Yu | H04W 36/165 455/436 |
| 2012/0044824 | A1* | 2/2012 | Osterling et al. | 370/252 |
| 2012/0208542 | A1* | 8/2012 | Yoshizawa | H04W 68/00 455/445 |
| 2013/0150054 | A1* | 6/2013 | Axmon | H04W 36/32 455/440 |
| 2013/0235847 | A1* | 9/2013 | Li et al. | 370/331 |
| 2014/0064158 | A1* | 3/2014 | Timus | H04W 36/30 370/279 |
| 2014/0220980 | A1* | 8/2014 | Teyeb et al. | 455/437 |

FOREIGN PATENT DOCUMENTS

| | | |
|---|---|---|
| JP | 2011-45033 A | 3/2011 |
| JP | 2011-166655 A | 8/2011 |

OTHER PUBLICATIONS

Extended European Search Report in counterpart European Application No. 12843981.7 issued Jul. 15, 2015 (7 pages).

* cited by examiner

BASE STATION AND COMMUNICATION SYSTEM TO RESTRICT COMMUNICATION SERVICE

FIELD OF THE INVENTION

The present invention relates to a base station and to a communication system.

BACKGROUND ART

In the field of mobile communication, a small-scale base station defining a cell of a small area has been proposed in addition to a macro-cell base station defining a macro cell of which the radius is from a few hundred meters to a few kilometers (for example, see Patent Document 1). In particular, an extremely small cell in which the radius is about a few meters is referred to as a femto cell, and the base station defining a femto cell is referred to as a femto base station or a femto-cell base station. It is assumed that femto base stations will be placed in houses or small offices.

In a technique described in Patent Document 1, when a mobile station visits a femto cell, in order to prompt the mobile station to communicate by means of the femto base station, a frequency guiding device informs the mobile station of the frequency used in the femto base station so as to guide the mobile station to capture the frequency and connect to the femto base station. The femto base station uses a frequency differing from that used by the macro base station. According to the technique described in Patent Document 1, when the mobile station is in a region in which a macro cell and a femto cell overlap, the mobile station is guided to use the femto base station rather than the macro base station. Accordingly, radio resources of the femto base station can be used, for example, by a small number of mobile stations, and therefore, these mobile stations can benefit from higher communication rates.

In recent years, third generation (3G) radio access technology is in widespread use. On the other hand, studies have been proceeding with LTE (Long Term Evolution) in 3GPP (Third Generation Partnership Project). As of now, base stations that can use both the 3G and LTE radio access technologies for communicating with mobile stations have not been in practical use. However, it is possible to manufacture base stations that can use both the 3G and LTE radio access technologies for communicating with mobile stations, in theory. Such base stations would be able to communicate with both a 3G dedicated mobile station and an LTE dedicated mobile station. In addition, mobile stations that can use both the 3G and LTE radio access technologies (hereinafter, referred to as "dual-type mobile stations") would be able to communicate with such base stations by using either one of the radio access technologies.

PRIOR ART DOCUMENTS

Patent Documents

Patent Document 1: JP-A-2011-19149

SUMMARY OF THE INVENTION

It can be envisioned that, even if a communication service by one of the radio access technologies becomes not executable at a base station that can use both the 3G and LTE radio access technologies (hereinafter, referred to as a "dual-type base station"), the base station would still be able to provide a communication service by another radio access technology. However, it is contemplated that, when the communication service by either one of radio access technologies is not executable, the communication service by means of the other radio access technology that is still available should not be utilized for the following reasons.

First, let us assume that the LTE service becomes unusable in a dual-type femto base station. In addition, let us assume that the technique for guiding to the femto base station described in Patent Document 1 is applied for only the LTE access technology, and the frequency used in the LTE access technology of the femto base station is notified to mobile stations. A mobile station that can use the LTE access technology would attempt to attach to the LTE access functional element of the femto base station. However, since the LTE service of the femto base station is unusable, the mobile station cannot attach to the LTE access functional element of the femto base station, and it would eventually attach to the macro base station or otherwise would abandon communication. If the technique for guiding to the LTE access function is working, not only LTE dedicated mobile stations, but also dual-type mobile stations will not use the 3G access technology of the femto base station. It will only be 3G dedicated mobile stations that can use the femto base station. It is expected that LTE-dedicated or dual-type mobile stations will increase in the future. Accordingly, it is contemplated that, when the LTE service of the dual-type femto base station becomes unusable, continuation of 3G access technology communication service, which will not be used very much, will be a waste, and thus will be just a cause of interference for mobile stations served by other base stations. A similar problem will occur when the 3G service of the femto base station becomes unusable in a case in which the guiding technique is applied only for guiding to the 3G access technology of the femto base station.

In addition, for dual-type mobile stations, a technique referred to as Fast Redirection has been proposed (for example, in JP-A-2011-45033). In Fast Redirection, when a dual-type mobile station requests a 3G base station to start communication, the 3G base station refuses the connection to the mobile station and informs the mobile station of a frequency used in an LTE base station. The mobile station uses the frequency to request the LTE base station to start communication. If Fast Redirection is executed in a dual-type femto base station, it is contemplated that, when a dual-type mobile station requests the 3G access technology element of the femto base station to start communication, the 3G access technology element would refuse the connection to the mobile station and would inform the mobile station of the frequency used in the LTE access functional element. The mobile station would use the frequency to request the LTE access functional element to start communication, but if the LTE service of the femto base station is unusable, the mobile station would request the 3G access technology element of the femto base station to start communication, again. This would cause a delay since the initial request for starting communication was issued by the mobile station until the communication is actually started.

Next, let us assume that the 3G service becomes unusable in a dual-type femto base station. In addition, let us assume that the technique for guiding to the femto base station described in Patent Document 1 is applied for only the LTE access technology, and the frequency used in the LTE access technology of the femto base station is notified to mobile stations. A mobile station that can use the LTE access technology will try to attach to the LTE access functional element of the femto base station. For example, if the technique for guiding to the LTE access function of the femto base station is executed at regular intervals (for example, one time per minute) for a dual-type mobile station attaching to a 3G macro base station, the mobile station will attach to the LTE access functional element of the femto base station for continuing communication. However, if the dual-type mobile station is provided with a function to stand by with the 3G access technology preferentially, the mobile station will stand by preferentially with the 3G access technology after the communication ends. If the mobile station stands by with, for example, the 3G access technology of the femto base station, when the mobile station starts communication next, the mobile station will attach to a 3G macro base station since the 3G service of the femto base station is unusable. Then, the guiding technique for guiding to the LTE access function of the femto base station is executed, so that the mobile station connects to the LTE access functional element of the femto base station for continuing communication. When the mobile station starts communication next, the mobile station would attach to a 3G macro base station first, and then attach to the LTE access functional element of the femto base station for continuing communication. Thus, even if the mobile station does not move, the mobile station would have to switch the connection to the femto base station from the 3G macro base station. Accordingly, heavy workload processes are frequently executed at both the network side and the mobile station, and the battery of the mobile station would drain quickly.

In LTE, CSFB (Circuit Switched Fallback) has been proposed for dual-type mobile stations (for example, in JP-A-2011-166655). According to CSFB, when a mobile station conducts voice call communication (i.e., telephone conversation), 3G access technology that is circuit switched communication is used. On the other hand, when the mobile station conducts data communication (including transmission of music files), the mobile station utilizes the LTE access technology. If the 3G service of the dual-type femto base station becomes unusable, the dual-type mobile station will attempt to attach to a 3G macro base station for voice call communication. However, in an environment in which quality of radiowaves from the 3G macro base station is inferior, there will be a possibility that communication cannot be made. In this case, the LTE service by the dual-type femto base station is still available, and therefore data communication is still possible on one hand, but voice communication is not possible on the other hand. This makes the user confused.

The above description has been made for illustrative purposes. Depending on environments of base stations, performance required for the communication system including base stations, policies of the operator of base stations, or other factors, when the communication service by either one of radio access technologies is not executable, the communication service by means of the other radio access technology that is still available should sometimes be continued, and should be stopped at other times.

Furthermore, there is a possibility that different frequency bands are used in communication between a mobile station and a base station even when a single radio access technology is used. For example, multiple frequency bands can be used in the LTE radio access technology, in which a frequency band can be used for data communication between a mobile station and a base station, whereas another frequency band can be used for voice call communication between the mobile station and the base station. At the base station that can treat all of these frequency bands, when processing for a frequency band becomes no longer possible, whether the radio communication service at another frequency band should be continued or stopped is dependent on the policy of an operator of the base station. An operator may prefer, when a communication service (for example, either of the voice call communication service or the data communication service) is not executable due to not being able to process a frequency band, the other communication service at the other frequency band (for example, the other of the voice call communication service and the data communication service) should be stopped in order to avoid confusing the user. Another operator may consider that, even if a communication service is not executable due to not being able to process a frequency band, continuation of the other communication service will offer benefits to the user as long as the other communication service can be continued.

Accordingly, the present invention provides a base station and a communication system in which, when a radio communication service becomes unusable in the base station that can offer multiple radio communication services, it is possible to adequately set whether or not another radio communication service should be continued at the base station.

A base station according to the present invention is characterized in that it has a first wireless communication unit adapted for communicating with mobile stations for offering a first radio communication service to the mobile stations; a second wireless communication unit adapted for communicating with mobile stations for offering a second radio communication service that is different from the first radio communication service to the mobile stations or other mobile stations; a first abnormality detector adapted for detecting that the first radio communication service becomes not executable; a second abnormality detector adapted for detecting that the second radio communication service becomes not executable; a communication service continuation restrictor adapted for restricting, when the first or second abnormality detector has detected that either one of the first and second radio communication services becomes not executable, operation of the base station as to whether or not another radio communication service should be continued, and it is settable whether or not the communication service continuation restrictor should continue the another radio communication service.

According to the present invention, the base station has a communication service continuation restrictor that, when either one of the first or the second radio communication service is not executable, restricts operation of the base station as to whether or not another radio communication service should be continued, and it is settable whether or not the communication service continuation restrictor should continue the another radio communication service. Therefore, when a radio communication service becomes not executable, whether or not another radio communication service should be continued at the base station can be adequately set depending on, for example, the environments of the base station, performance required for a communication system including the base station, the policy of an operator of the base station, or on other factors.

It may be set so that, when it is detected that the first radio communication service is not executable, the second radio communication service is continued, or it may be set so that, when it is detected that the first radio communication service is not executable, the second radio communication service is stopped. It may be set so that, when it is detected that the second radio communication service is not executable, the first radio communication service is continued, or it may be set so that, when it is detected that the second radio communication service is not executable, the first radio communication service is stopped. It may be set so that, when it is detected that either one of the radio communication services is not executable, another radio communication service is stopped (i.e., both radio communication services are discontinued).

The first abnormality detector may have: a first internal failure detector adapted for detecting a failure of a function for the first radio communication service within the base station; and a first network-communication-abnormality detector adapted for detecting an abnormality of communication between the base station and a device in a first network that communicates with the base station when the base station communicates with the mobile stations for offering the first radio communication service to the mobile stations; and the second abnormality detector may have: a second internal failure detector adapted for detecting a failure of a function for the second radio communication service within the base station; and a second network-communication-abnormality detector adapted for detecting an abnormality of communication between the base station and a device in a second network that communicates with the base station when the base station communicates with the mobile stations for offering the second radio communication service to the mobile stations, when the first or second internal failure detector has detected a failure of a function for the first or second radio communication service, the communication service continuation restrictor may be adapted for restricting operation of the base station as to whether or not another radio communication service should be continued, and when the first or second network-communication-abnormality detector has detected an abnormality of communication between the base station and the device in the first or second network, the communication service continuation restrictor may be adapted for restricting operation of the base station as to whether or not another radio communication service should be continued; it may be settable whether or not the communication service continuation restrictor should continue the another radio communication service if the first or second internal failure detector has detected a failure of a function for the first or second radio communication service; and it may be settable whether or not the communication service continuation restrictor should continue the another radio communication service if the first or second network-communication-abnormality detector has detected an abnormality of communication between the base station and the device in the first or second network.

The base station according to the present invention may further have a first neighboring base station detector adapted for detecting another base station located near the base station that communicates with mobile stations for offering the first radio communication service to the mobile stations; a second neighboring base station detector adapted for detecting another base station located near the base station that communicates with mobile stations for offering the second radio communication service to the mobile stations; and a communication service-continuation restriction setter adapted for setting the communication service continuation restrictor so as not to continue the first radio communication service when the first neighboring base station detector has detected another base station that communicates with mobile stations for offering the first radio communication service to the mobile stations, and when the second abnormality detector has detected that the second radio communication service becomes not executable, the communication service-continuation restriction setter adapted for setting the communication service continuation restrictor so as to continue the first radio communication service when the first neighboring base station detector has not detected another base station that communicates with mobile stations for offering the first radio communication service to the mobile stations, and when the second abnormality detector has detected that the second radio communication service becomes not executable, the communication service-continuation restriction setter adapted for setting the communication service continuation restrictor so as not to continue the second radio communication service when the second neighboring base station detector has detected another base station that communicates with mobile stations for offering the second radio communication service to the mobile stations, and when the first abnormality detector has detected that the first radio communication service becomes not executable, and the communication service-continuation restriction setter adapted for setting the communication service continuation restrictor so as to continue the second radio communication service when the second neighboring base station detector has not detected another base station that communicates with mobile stations for offering the second radio communication service to the mobile stations, and when the first abnormality detector has detected that the first radio communication service becomes not executable.

In this case, when it is detected that a radio communication service is not executable at the base station, if there is a neighboring base station that can provide a radio communication service that is still usable at the base station, the still usable another radio communication service is caused to be stopped. On the other hand, if there is no neighboring base station that can provide a radio communication service that is still usable at the base station, when it is detected that a radio communication service is not executable at the base station, the usable another radio communication service is caused to be continued.

More precisely, if there is a neighboring base station that can provide the first radio communication service, when it is detected that the second radio communication service is not executable at the base station, the still usable first radio communication service is caused to be stopped. Because mobile stations that can use the first radio communication service use the other neighboring base station that can provide the first radio communication service, there will be no major problem caused even if the first radio communication service of the base station stops. On the other hand, if there is no neighboring base station that can provide the first radio communication service, when it is detected that the second radio communication service is not executable at the base station, the usable first radio communication service is caused to be continued. That is, for mobile stations that can use the first radio communication service, the first radio communication service of the base station is caused to be continued.

If there is a neighboring base station that can provide the second radio communication service, when it is detected that the first radio communication service is not executable at the base station, the still usable second radio communication service is caused to be stopped. Because mobile stations that can use the second radio communication service use the other neighboring base station that can provide the second radio communication service, there will be no major problem caused even if the second radio communication service of the base station stops. On the other hand, if there is no neighboring base station that can provide the second radio communication service, when it is detected that the first radio communication service is not executable at the base station, the usable second radio communication service is caused to be continued. That is, for mobile stations that can use the second radio communication service, the second radio communication service of the base station is caused to be continued.

A communication system according to the present invention may have the base station according to the present invention; a first device in a first network that communicates with the base station when the base station communicates with the mobile stations for offering the first radio communication service to the mobile stations; and a second device in a second network that communicates with the base station when the base station communicates with the mobile stations for offering the second radio communication service to the mobile stations, and each of the first device and the second device may have: a storage unit for storing restriction information indicating whether or not the base station should continue the another radio communication service; and a transmitter adapted for transmitting the restriction information to the base station when either one of the first and second radio communication services becomes not executable in the base station; and the base station may have a communication service-continuation restriction setter adapted for setting the communication service continuation restrictor as to whether or not the another radio communication service should be continued, in accordance with the restriction information.

According to this communication system, when one of the first and the second radio communication services of the base station is not executable, the transmitter of the first device or the second device transmits restriction information to the base station. The base station sets, in accordance with the restriction information, the communication service continuation restrictor as to whether or not another radio communication service should be continued. Thus, it is possible to control whether another radio communication service should be continued at the base station in accordance with the restriction information from a device other than the base station.

DESCRIPTION OF EMBODIMENTS

In the following, various embodiments according to the present invention will be described with reference to the drawings.

System Configuration

Figure 1:
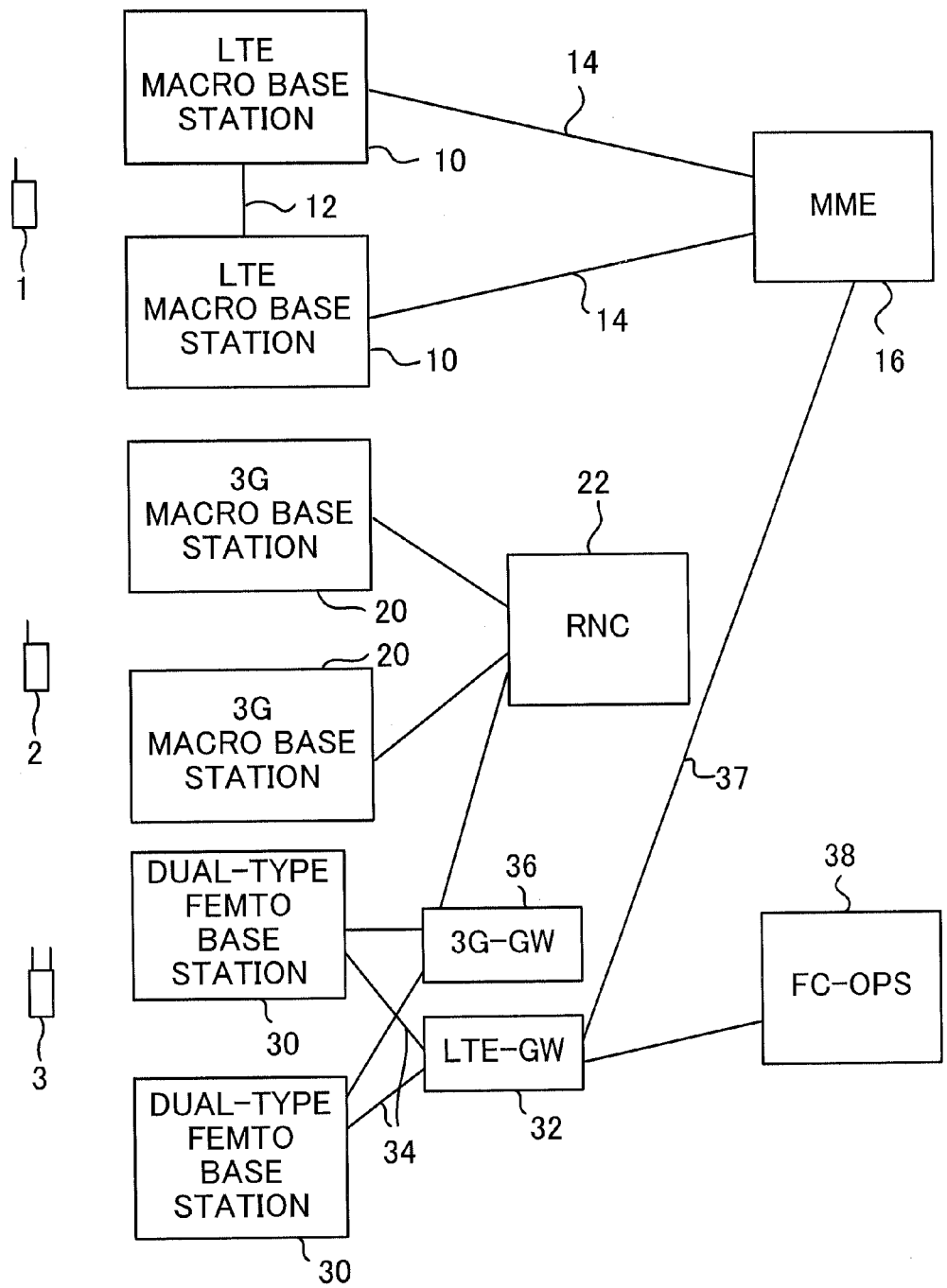
FIG. 1 is a block diagram showing a communication system including base stations of embodiments of according to the present invention.

As shown in FIG. 1, a communication system according to an embodiment of the present invention has LTE macro base stations 10, 3G macro base stations 20, and dual-type femto base stations 30. Each of LTE macro base stations 10 communicates with an LTE dedicated mobile station 1 and a dual-type mobile station 3 by using a radio access technology for LTE (for example, OFDMA (Orthogonal Frequency Division Multiple Access) for a forward link and SC-FDMA (Single Carrier Frequency Division Multiple Access) for an upward link. Each of 3G macro base stations 20 communicates with an 3G dedicated mobile station 2 and dual-type mobile station 3 by using 3G radio access technology (i.e., CDMA (Code Division Multiple Access)). Each of dual-type femto base stations 30 can use both the 3G and LTE radio access technologies. Specifically, dual-type femto base station 30 uses the LTE radio access technology to communicate with LTE dedicated mobile station 1 and dual-type mobile station 3, and uses the 3G radio access technology to communicate with 3G dedicated mobile station 2 and dual-type mobile station 3.

LTE macro base stations 10 are connected by an X2 interface 12 with each other, so that the stations can communicate with each other. Each of LTE macro base stations 10 is connected to an upper node station, MME (Mobility Management Entity) 16, by an S1 interface 14. MME 16 manages the locations of mobile stations 1,3 that use the LTE radio access technology.

Each of 3G macro base stations 20 is connected to an upper node station, RNC (Radio Network Controller) 22, by an Tub interface. RNC 22 manages the locations of mobile station 2,3 that use the 3G radio access technology, and links each of those mobile stations with an external network (not shown).

Each of dual-type femto base stations 30 is connected to a 3G gateway (3G-GW) 36 by an Iuh interface. 3G-GW 36 is an HNB-GW (Home Node B Gateway) and is connected to RNC 22. Therefore, the locations of mobile stations communicating with femto base station 30 by the 3G radio access technology are managed by RNC 22. Signal exchange, i.e., communication, between femto base station 30 and 3G-GW 36, conforms to an IPSec (Security Architecture for Internet Protocol). On the other hand, signal exchange, i.e., communication, between femto base station 30 and RNC 22 conforms to an SCTP (Stream Control Transmission Protocol).

Each of dual-type femto base stations 30 is connected to an LTE gateway (LTE-GW) 32 by an S1 interface 34. LTE-GW 32 is an HeNB-GW (Home eNode B Gateway) and is connected to MME 16 by an S1-MME interface 37. Therefore, the locations of mobile stations communicating with femto base station 30 by the LTE radio access technology are managed by MME 16. LTE-GW 32 is also connected to an FC-OPS (femto cell operation system) 38. FC-OPS 38 links each of mobile stations that communicate with femto base station 30 by the LTE radio access technology with an external network (not shown). It is to be noted that, although not shown, the FC-OPS may be connected to the 3G-GW. Signal exchange, i.e., communication, between femto base station 30 and LTE-GW 32 conforms to IPSec. On the other hand, signal exchange, i.e., communication, between femto base station 30 and MME 16 conforms to SCTP.

Each of dual-type femto base stations 30 is connected to a 3G gateway (3G-GW) 36 by an Iuh interface. 3G-GW 36 is an HNB-GW (Home Node B Gateway) and is connected to RNC 22. Therefore, the locations of mobile stations that communicate with femto base station 30 by the 3G radio access technology are managed by RNC 22. Signal exchange, i.e., communication, between femto base station 30 and 3G-GW 36 conforms to IPSec (Security Architecture for Internet Protocol). On the other hand, signal exchange, i.e., communication, between femto base station 30 and RNC 22 conforms to SCTP (Stream Control Transmission Protocol). Although not shown, each of dual-type femto base stations 30 may connect to the RNC by the Iub interface. Communication conforming to the above-described IPSec and SCTP is performed also in this case.

Furthermore, each of dual-type femto base stations 30 is connected to LTE gateway (LTE-GW) 32 by S1 interface 34. LTE-GW 32 is an HeNB-GW (Home eNode B Gateway) and is connected to MME 16 by S1-MME interface 37. Therefore, the locations of mobile stations that communicate with femto base station 30 by the LTE radio access technology are managed by MME 16. Also, LTE-GW 32 is connected to an FC-OPS (femto cell operation system) 38. FC-OPS38 links each of mobile stations that communicate with femto base station 30 by the LTE radio access technology with an external network (not shown). However, although not shown, the FC-OPS may be connected to the 3G-GW. Signal exchange, i.e., communication, between femto base station 30 and LTE-GW 32 conforms to IPSec. On the other hand, signal exchange, i.e., communication, between femto base station 30 and MME 16 conforms to SCTP. Also, although not shown, each of dual-type femto base stations 30 may be configured to connect to MME by Iuh/S1 interface 34. Communication conforming to the above-described IPSec and SCTP is performed also in this case.

Hereinafter, a network having 3 G-GW 36 and RNC 22 that communicate with femto base station 30 when femto base station 30 communicates with mobile stations by the 3G radio access technology (first radio access technology, first radio communication service) will be referred to as a 3G network (first network). Also, a network having LTE-GW 32, MME 16, and FC-OPS38 that communicate with femto base station 30 when femto base station 30 communicates with mobile stations by the LTE radio access technology (second radio access technology, second radio communication service) will be referred to as an LTE network (second network).

First Embodiment

Figure 2:
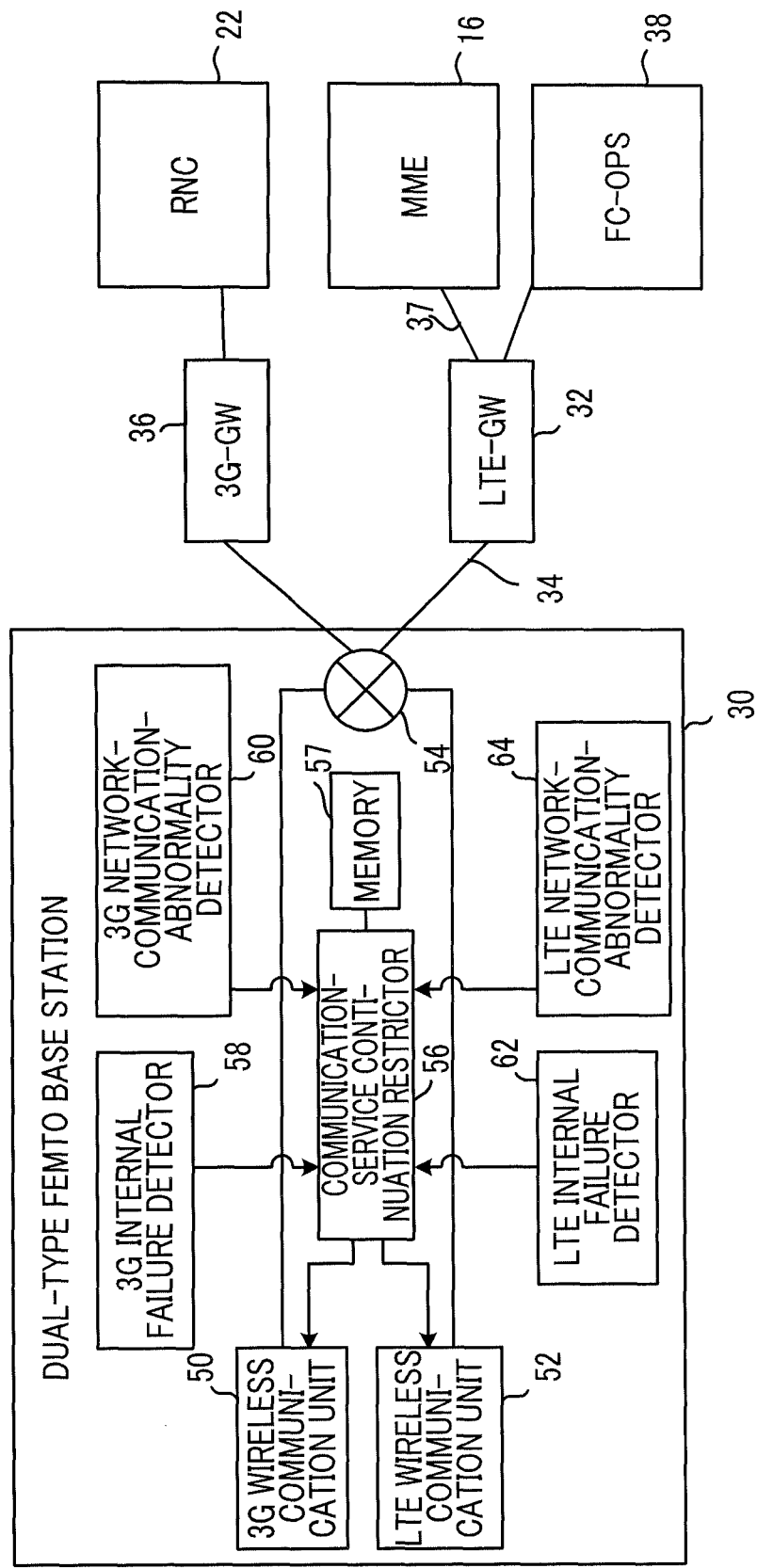
FIG. 2 is a block diagram showing a dual-type femto base station of a first embodiment of according to the present invention.

As shown in FIG. 2, dual-type femto base station 30 has a 3G wireless communication unit (first wireless communication unit) 50, an LTE wireless communication unit (second wireless communication unit) 52, an integrated communication controller 54, a 3G internal failure detector (first abnormality detector, first internal failure detector) 58, a 3G network-communication-abnormality detector (first abnormality detector, first network-communication-abnormality detector) 60, an LTE internal failure detector (second abnormality detector, second internal failure detector) 62, an LTE network-communication-abnormality detector (second abnormality detector, second network-communication-abnormality detector) 64, and a communication service continuation restrictor 56, and a memory 57.

3G wireless communication unit 50 is provided with a communication circuit that generates or processes signals in order to communicate with mobile stations with the 3G radio access technology, a transmitter antenna that transmits radio signals to mobile stations by the 3G radio access technology, and a receiver antenna that receives radio signals from mobile stations by the 3G radio access technology. The functions of the transmitter antenna and the receiver antenna may be achieved by a single antenna. The communication circuit has a baseband processing circuit and other circuits.

LTE wireless communication unit 52 is provided with a communication circuit that generates or processes signals in order to communicate with mobile stations by the LTE radio access technology, one or more transmitter antennas that transmit radio signals to mobile stations by the LTE radio access technology, and one or more receiver antennas that receive radio signals from mobile stations by the LTE radio access technology. The functions of the transmitter antenna and the receiver antenna may be achieved by a single antenna. The transmitter antenna of LTE wireless communication unit 52 may be used as the transmitter antenna of 3G wireless communication unit 50, and the receiver antenna of LTE wireless communication unit 52 may be used as the receiver antenna of 3G wireless communication unit 50. The communication circuit has a baseband processing circuit and other circuits.

Integrated communication controller 54 physically has a processor of dual-type femto base station 30, a communication interface with and the 3G network, and a communication interface with the LTE network. The processor of femto base station 30 executes a computer program stored in memory 57, to serve as an integrated communication controller 54 in accordance with the computer program, thereby to control the radio communication 3G at wireless communication unit 50 and the radio communication at the LTE wireless communication unit 52 and communicate with 3G-GW 36 and LTE-GW 32.

Communication-service continuation restrictor 56, 3G internal failure detector 58, 3G network-communication-abnormality detector 60, LTE internal failure detector 62, and LTE network-communication-abnormality detector 64 can be functional blocks actualized by the processor of femto base station 30 executing a computer program stored in memory 57 and functioning in accordance with the computer program.

3G internal failure detector 58 and 3G network-communication-abnormality detector 60 detect that a communication service by the 3G radio access technology is not executable. Specifically, 3G internal failure detector 58 detects a failure of a 3G radio access technology function within femto base station 30, i.e., a malfunction of 3G wireless communication unit 50. 3G network-communication-abnormality detector 60 detects an abnormality of communication between a device (3G-GW 36 or RNC 22) in the 3G network (first network) and femto base station 30. In other words, 3G network-communication-abnormality detector 60 can detect an interruption of communication with 3G-GW 36 compliant with IPSec, and can detect an interruption of communication with RNC 22 compliant with SCTP.

LTE internal failure detector 62 and LTE network-communication-abnormality detector 64 detect that a communication service by the LTE radio access technology is not executable. Specifically, LTE internal failure detector 62 detects a failure of an LTE radio access technology function within femto base station 30, i.e., a malfunction of LTE wireless communication unit 52. LTE network-communication-abnormality detector 64 detects an abnormality of communication between a device (LTE-GW 32 or MME 16) in the LTE network (second network) and femto base station 30. In other words, LTE network-communication-abnormality detector 64 can detect an interruption of communication with LTE-GW 32 compliant with IPSec and can detect an interruption of communication with MME 16 compliant with SCTP.

Communication-service continuation restrictor 56, when at least one of 3G internal failure detector 58 and 3G network-communication-abnormality detector 60 detects that the communication service by the 3G radio access technology is not executable, restricts operation of femto base station 30 including LTE wireless communication unit 52, etc., as to whether or not the communication service by the LTE radio access technology should be continued. Also, communication-service continuation restrictor 56, when at least one of LTE internal failure detector 62 and LTE network-communication-abnormality detector 64 detects that the communication service by the LTE radio access technology is not executable, restricts operation of femto base station 30 including 3G wireless communication unit 50, etc., as to whether or not the communication service by the 3G radio access technology should be continued.

Whether or not, when it is detected that a communication service by one radio access technology is not executable, a communication service by the other radio access technology should be continued at communication-service continuation restrictor 56 can be set by a service-continuation flag, which is restriction information stored in memory 57. For example, an operator of femto base station 30 can set this service-continuation flag ON or OFF for storage into memory 57.

The service-continuation flag stored in memory 57 indicates whether or not, when it is detected that a communication service by one radio access technology is not executable, a communication service by the other radio access technology should be continued. If the service-continuation flag is ON, when it is detected that a communication service by one radio access technology is not executable, communication-service continuation restrictor 56 continues a communication service by the other radio access technology. If the service-continuation flag is OFF, when it is detected that a communication service by one radio access technology is not executable, communication-service continuation restrictor 56 controls operation of femto base station 30 so that a communication service by the other radio access technology is stopped.

Thus, femto base station 30 is provided with communication-service continuation restrictor 56 that restricts operation of femto base station 30 as to whether or not, when it is detected that a communication service by either 3G or LTE radio access technology is not executable, a communication service by the other radio access technology should be continued, and it is settable whether or not communication-service continuation restrictor 56 should continue a communication service by the other radio access technology. Therefore, when a communication service by one radio access technology becomes not executable, whether or not to continue a service by the other radio access technology at the base station can be adequately set depending on, for example, the environments of femto base station 30, performance required for a communication system including femto base station 30, the policy of an operator of the base station, or on other factors.

Figure 3:
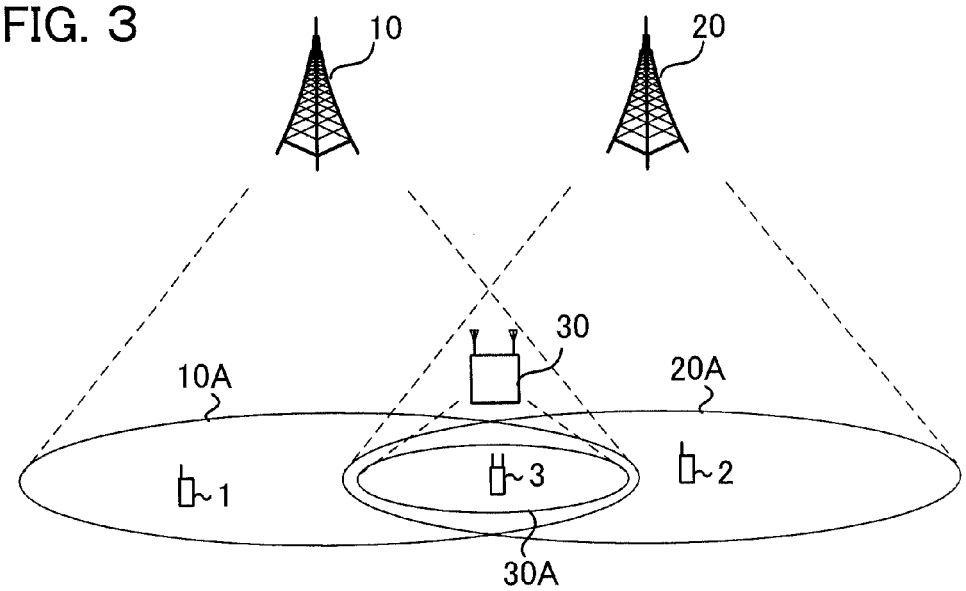
FIG. 3 is a schematic diagram showing the communication system used for describing whether or not, when one of radio communication services becomes unusable, the other radio communication service should be continued in the base station of the first embodiment of the present invention.

Examples are now given of a guideline for setting the service-continuation flag to be ON or OFF. An operator of femto base station 30 can set the service-continuation flag to be OFF when femto base station 30 is arranged inside both a cell 10A of an LTE macro base station 10 and a cell 20A of an 3G macro base station 20 (when, as shown in FIG. 3, a cell 30A of femto base station 30 overlaps with both cell 10A and cell 20A). Otherwise, the operator of femto base station 30 can set the service-continuation flag to be ON.

As described above, let us assume that the LTE service becomes unusable in the dual-type femto base station 30. In addition, let us assume that the technique for guiding to the femto base station described in Patent Document 1 is applied for only the LTE access technology, and the frequency used in the LTE access technology of femto base station 30 is notified to dual-type mobile station 3. Mobile station 3 that can use the LTE access technology will try to attach to the LTE access functional element (LTE wireless communication unit 52) of femto base station 30. However, since the LTE service of femto base station 30 is unavailable, mobile station 3 cannot attach to the LTE access functional element of femto base station 30, and the mobile station would therefore attach to the LTE macro base station 10 or 3G macro base station 20 or abandon communication.

Accordingly, if the technique for guiding to the LTE access function of femto base station 30 is working, not only the LTE dedicated mobile station 1, but also dual-type mobile station 3, will not use the 3G access technology of femto base station 30. Only the 3G dedicated mobile station 2 will be able to use femto base station 30. It is expected that LTE-dedicated or dual-type mobile stations will increase in the future. Accordingly, it is contemplated that when the LTE service of the dual-type femto base station 30 becomes unusable, continuation of 3G access technology communication service, which will not be used very much, will be a waste, and thus will be just a cause of interference for mobile stations served by other base stations. A similar problem will occur when the 3G service of the femto base station becomes unusable in a case in which the guiding technique is applied only for guiding to the 3G access technology of the femto base station.

Therefore, when the LTE service of dual-type femto base station 30 becomes unavailable in a case in which a cell 30A of dual-type femto base station 30 overlaps with cell 20A of 3G macro base station 20 as shown in FIG. 3, it can be said that the 3G service of dual-type femto base station 30 is better to be stopped. Because 3G dedicated mobile station 2 and dual-type mobile station 3 can perform communication by using 3G macro base station 20, stopping the 3G service of dual-type of femto base station 30 does not cause a major problem.

On the other hand, in a case in which cell 30A of femto base station 30 does not overlap with cell 20A of 3G macro base station 20, when the LTE service of dual-type femto base station 30 becomes unavailable, the 3G service of dual-type femto base station 30 is preferably to be continued. 3G dedicated mobile station 2 and dual-type mobile station 3 can perform communication by using the 3G service of dual-type femto base station 30 even if there is no 3G macro base station 20 nearby.

When the LTE service of dual-type femto base station 30 is unavailable in a case in which cell 30A of femto base station 30 does not overlap with cell 10A of LTE macro base station 10, the 3G service of dual-type femto base station 30 may preferably be continued. In a case in which cell 30A of femto base station 30 does not overlap with cell 10A of LTE macro base station 10 and the LTE service of dual-type femto base station 30 becomes unavailable, the guiding technique to femto base station 30 does not work. Accordingly, dual-type mobile station 3 will not make a useless attempt to connect to the LTE access functional element of femto base station 30 and can perform communication by using the 3G service of femto base station 30 or 3G macro base station 20.

As described above, if Fast Redirection is executed in dual-type femto base station 30, it is contemplated that when dual-type mobile station 3 requests the 3G access technology element (3G wireless communication unit 50) of femto base station 30 to start communication, the 3G access technology element will refuse the connection to mobile station 3 and will inform mobile station 3 of the frequency used in the LTE access functional element. Mobile station 3 will use the frequency to request the LTE access functional element to start communication, but if the LTE service of femto base station 30 is unavailable, mobile station 3 will request the 3G access technology element of femto base station 30 to start communication, again. This will cause a delay since the initial request of starting communication was issued by mobile station 3 until the communication is actually started. Such a delay will not be caused if the 3G service of dual-type femto base station 30 is stopped when the LTE service of dual-type femto base station 30 is unavailable. In a case in which dual-type cell 30A of femto base station 30 overlaps both with cell 10A of LTE macro base station 10 and 3G macro base station 20, Fast Redirection would be executed, and mobile station 3 would promptly connect to LTE macro base station 10 even if 3G macro base station 20 refuses the connection with dual-type mobile station 3.

Next, let us assume that the 3G service becomes unusable in dual-type femto base station 30. In addition, let us assume that the technique for guiding to the femto base station described in Patent Document 1 is applied for only the LTE access technology, and the frequency used in the LTE access technology of femto base station 30 is notified to mobile station 3. Mobile station 3 that can use the LTE access technology would try to attach to the LTE access functional element (LTE wireless communication unit 52) of femto base station 30. For example, if the technique for guiding to the LTE access function of femto base station 30 is executed at regular intervals (for example, one time per minute) when dual-type mobile station 3 is attaching to 3G macro base station 20, mobile station 3 would attach to the LTE access functional element of femto base station 30 for continuing communication. However, if dual-type mobile station 3 is provided with a function to stand by with the 3G access technology preferentially, mobile station 3 would stand by preferentially with the 3G access technology after the end of communication. If mobile station 3 stands by with, for example, the 3G access technology of femto base station 30, when mobile station 3 starts communication next, mobile station 3 would attach to 3G macro base station 20 since 3G service of femto base station 30 is unusable. Then, the guiding technique for guiding to the LTE access function of femto base station 30 is executed, and mobile station 3 would connect to the LTE access functional element of femto base station 30 for continuing communication. When mobile station 3 starts communication next, mobile station 3 would attach to 3G macro base station 20 first, and then attach to the LTE access functional element of femto base station 30 for continuing communication. Thus, even if mobile station 3 does not move, mobile station 3 would have to switch the connection to femto base station 30 from 3G macro base station 20. Accordingly, heavy workload processes are frequently executed at both the network side and mobile station 3, and the battery of mobile station 3 would drain quickly. A similar problem will occur when the LTE service of the femto base station becomes unusable in a case in which the guiding technique is applied only to the 3G access technology of the femto base station, and in which dual-type mobile station 3 is provided with a function to stand by with the LTE access technology preferentially.

Therefore, as shown in FIG. 3, when the 3G service of dual-type femto base station 30 becomes unavailable in a case in which dual-type cell 30A of femto base station 30 overlaps with cell 10A of LTE macro base station 10, it can be said that the LTE service of dual-type femto base station 30 is also better to be stopped. Because LTE dedicated mobile station 1 and dual-type mobile station 3 can perform communication by using LTE macro base station 10, stopping the LTE service of dual-type femto base station 30 will not cause a major problem. By stopping not only the 3G service of femto base station 30, but also the LTE service thereof, the guiding technique to femto base station 30 does not work on mobile station 3; and accordingly, dual-type mobile station 3 does not make a useless attempt to connect to the LTE access functional element of femto base station 30 and can perform communication by using LTE macro base station 10 or 3G macro base station 20.

On the other hand, when the 3G service of dual-type femto base station 30 becomes unavailable in a case in which cell 30A of femto base station 30 does not overlap with cell 10A of LTE macro base station 10, the LTE service of dual-type femto base station 30 is preferably continued. LTE dedicated mobile station 1 and dual-type mobile station 3 can perform communication by using the LTE service of dual-type femto base station 30 even if there is no LTE macro base station 10 nearby.

In a case in which CSFB is applied by which dual-type mobile station 3 uses the 3G access technology for voice call communication and uses the LTE access technology for data communication, if the 3G service of the dual-type femto base station 30 becomes unusable, dual-type mobile station 3 will attempt to attach to 3G macro base station 20 for voice call communication. However, in an environment in which quality of radiowaves from 3G macro base station 20 is inferior, there will be a possibility that communication cannot be accomplished. In this case, whereas the LTE service is still available by the dual-type femto base station 30 and the data communication is still possible, the voice communication is no longer possible. This makes the user confused. Therefore, when the 3G service of dual-type femto base station 30 becomes unavailable in a case in which cell 30A of femto base station 30 does not overlap with cell 20A of 3G macro base station 20, the LTE service of femto base station 30 may also be preferably stopped.

Considering the above circumstances in a comprehensive manner, in a case in which cell 30A of femto base station 30 overlaps both with cell 10A and cell 20A as shown in FIG. 3, the service-continuation flag may preferably set to be OFF, so that, when a communication service by either one of the radio access technologies is not executable, a communication service by the other radio access technology is stopped. Also, in a case in which cell 30A of femto base station 30 overlaps with neither cell 10A or cell 20A, the service-continuation flag may preferably be set to be ON, so that the communication service by the other radio access technology is continued.

However, the above description has been made for illustrative purposes, and when cell 30A of femto base station 30 overlaps with either cell 10A or cell 20A, the service-continuation flag may be set to be OFF; when cell 30A of femto base station 30 overlaps with neither cell 100A nor cell 20A, the service-continuation flag may be set to be ON.

In short, a guideline for setting the service-continuation flag to be ON or OFF can be adequately determined by an operator of femto base station 30 depending on the environments of femto base station 30, performance required for a communication system including femto base station 30, the policy of the operation of the base station, or on other factors.

In the above embodiment, a single service-continuation flag is stored in memory 57, but multiple service-continuation flags may be stored in memory 57. For example, a service-continuation flag at the time of internal failure and a service-continuation flag at the time of network abnormality may be stored in memory 57. The service-continuation flag at the time of internal failure indicates, when 3G internal failure detector 58 detects a failure of the 3G radio access technology function, i.e., a malfunction of 3G wireless communication unit 50, or when LTE internal failure detector 62 detects a failure of the LTE radio access technology function, i.e., a malfunction of the LTE wireless communication unit 52, whether or not a communication service by the other radio access technology should be continued. If the service-continuation flag at the time of internal failure is ON, when a failure of one of the radio access technology functions is detected, communication-service continuation restrictor 56 continues the communication service by the other radio access technology. If the service-continuation flag at the time of internal failure is OFF, when a failure of one of the radio access technology functions is detected, communication-service continuation restrictor 56 controls operation of femto base station 30 so that the communication service of the other radio access technology is stopped.

The service-continuation flag at the time of network abnormality indicates, when 3G network-communication-abnormality detector 60 detects an abnormality of communication between a device in the 3G network (3G-GW 36 or RNC 22) and femto base station 30 or when LTE network-communication-abnormality detector 64 detects an abnormality of communication between a device in the LTE network (LTE-GW 32 or MME 16) and femto base station 30, whether or not a communication service by the other radio access technology should be continued. If the service-continuation flag at the time of network abnormality is ON, when an abnormality of communication with a device in one of the networks is detected, communication-service continuation restrictor 56 continues the communication service by the other radio access technology. If the service-continuation flag at the time of network abnormality is OFF, when a communication abnormality with a device in one of the networks is detected, communication-service continuation restrictor 56 controls operation of femto base station 30 so that the communication service by the other radio access technology is stopped.

Both the service-continuation flag at the time of internal failure and the service-continuation flag at the time of network abnormality indicate whether or not to continue a communication service by the other radio access technology when it is detected that a communication service by one of the radio access technologies is not executable. However, the service-continuation flag at the time of internal failure and the service-continuation flag at the time of network abnormality are different in specific operations of femto base station 30 when OFF is set. When the service-continuation flag at the time of internal failure is OFF, when a failure of one of the radio access technology functions is detected, femto base station 30 transmits an alarm signal, to stop radio transmission and radio reception by the still usable radio access technology. For the restoration from the failure, femto base station 30 autonomously stops power supply to restart the computer program. If the radio access technology is not restored even by the restarting, femto base station 30 again transmits an alarm signal, and the operator replaces the device inside femto base station 30. On the other hand, when an abnormality of communication with a device in one of the networks is detected in a case in which the service-continuation flag at the time of network abnormality is OFF, femto base station 30 stops radio transmission and radio reception by both radio access technologies. Also, for the restoration from the failure, integrated communication controller 54 of femto base station 30 repeats attempts for communication connection with a device in a network where the abnormality has taken place. If the connection is resumed, femto base station 30 resumes radio transmission and radio reception by both radio access technologies. If the connection cannot be resumed, the operator replaces a device inside femto base station 30. When both the service-continuation flag at the time of internal failure and the service-continuation flag at the time of network abnormality are ON (when the communication service by the other radio access technology is continued), the above restoration operation may be performed but does not have to be performed.

An LTE service-continuation flag at the time of 3G malfunctioning and a 3G service-continuation flag at the time of LTE malfunctioning may be stored in memory 57. The LTE service-continuation flag at the time of 3G malfunctioning indicates, when 3G internal failure detector 58 detects a failure of the 3G radio access technology function, i.e., a malfunction of 3G wireless communication unit 50, or when 3G network-communication-abnormality detector 60 detects an abnormality in communication between a device in the 3G network (3G-GW 36 or RNC 22) and femto base station 30, whether or not the communication service by the LTE radio access technology should be continued. If the LTE service-continuation flag at the time of 3G malfunctioning is ON, when the communication service by 3G is not executable (when a malfunction of 3G wireless communication unit 50 or an abnormality of communication with a device in the 3G network is detected), communication-service continuation restrictor 56 continues the communication service by the LTE radio access technology. If the LTE service-continuation flag at the time of 3G malfunctioning is OFF, when the communication service by 3G is not executable, communication-service continuation restrictor 56 controls operation of femto base station 30 so that the communication service by the LTE radio access technology is stopped.

The 3G service-continuation flag at the time of LTE malfunctioning indicates, when LTE internal failure detector 62 detects a failure of the LTE radio access technology function, i.e., a malfunction of the LTE wireless communication unit 52 or when LTE network-communication-abnormality detector 64 detects an abnormality of communication between a device in the LTE network (LTE-GW 32 or MME 16) and femto base station 30, whether or not the communication service by the 3G radio access technology should be continued. If the 3G service-continuation flag at the time of LTE malfunctioning is ON, when the communication service by LTE is not executable (when a malfunction of LTE wireless communication unit 52 or an abnormality of communication with a device in the LTE network is detected), communication-service continuation restrictor 56 continues the communication service by the 3G radio access technology. If the 3G service-continuation flag at the time of LTE malfunctioning is OFF, when the communication service by LTE is not executable, communication-service continuation restrictor 56 controls operation of femto base station 30 so that the communication service by the 3G radio access technology is stopped.

For example, it is possibly preferable to set the LTE service-continuation flag at the time of 3G malfunctioning to be OFF when femto base station 30 is arranged inside cell 10A of LTE macro base station 10, or to set the LTE service-continuation flag at the time of 3G malfunctioning to be ON when femto base station 30 is arranged outside cell 10A of LTE macro base station 10. This is because when femto base station 30 is arranged inside cell 10A of LTE macro base station 10, one of the above problems might occur if the LTE service is continued at the time of 3G malfunctioning, whereas when femto base station 30 is arranged outside cell 10A of LTE macro base station 10, continuing the LTE service is convenient for LTE dedicated mobile station 1 and dual-type mobile station 3 to use the LTE service.

Also, when femto base station 30 is arranged inside cell 20A of 3G macro base station 20, it is possibly preferable to set the 3G service-continuation flag at the time of LTE malfunctioning to be OFF, and when femto base station 30 is arranged outside cell 20A of 3G macro base station 20, to set the 3G service-continuation flag at the time of LTE malfunctioning to be ON. This is because when femto base station 30 is arranged inside cell 20A of 3G macro base station 20, one of the above problems might occur if the 3G service is continued at the time of LTE malfunctioning, whereas when femto base station 30 is arranged outside cell 20A of 3G macro base station 20, continuing the 3G service is convenient for 3G dedicated mobile station 2 and dual-type mobile station 3 to use the 3G service.

Furthermore, the service-continuation flag at the time of internal failure, the service-continuation flag at the time of network abnormality, the LTE service-continuation flag at the time of 3G malfunctioning, and the 3G service-continuation flag at the time of LTE malfunctioning may be combined. In other words, in memory 57, an LTE service-continuation flag at the time of 3G internal failure, a 3G service-continuation flag at the time of LTE internal failure, an LTE service-continuation flag at the time of 3G network abnormality, and a 3G service-continuation flag at the time of LTE network abnormality, may be stored. The LTE service-continuation flag at the time of 3G internal failure indicates, when 3G internal failure detector 58 detects a failure of the 3G radio access technology function, i.e., a malfunction of 3G wireless communication unit 50, whether or not communication service by the LTE radio access technology should be continued. The 3G service-continuation flag at the time of LTE internal failure indicates, when LTE internal failure detector 62 detects a failure of the LTE radio access technology function, i.e., a malfunction of LTE wireless communication unit 52, whether or not the communication service 3G by the radio access technology is to be continued. The LTE service-continuation flag at the time of 3G network failure indicates, when 3G network-communication-abnormality detector 60 detects an abnormality of communication between a device in the 3G network (3G-GW 36 or RNC 22) and femto base station 30, whether or not the communication service by the LTE radio access technology should be continued. The 3G service-continuation flag at the time of LTE network abnormality indicates, when LTE network-communication-abnormality detector 64 detects an abnormality of communication between a device in the LTE network (LTE-GW 32 or MME 16) and femto base station 30, the communication service by the 3G radio access technology should be continued. Specific operations of femto base station 30 as of when these flags are ON or OFF would be understood by taking the above description into account.

In the above embodiment, the restriction information, stored in memory 57, defining operation of communication-service continuation restrictor 56 is in the form of a flag, but the form of the restriction information is not limited to a flag, and it may be, for example, a system parameter.

Second Embodiment

Figure 4:
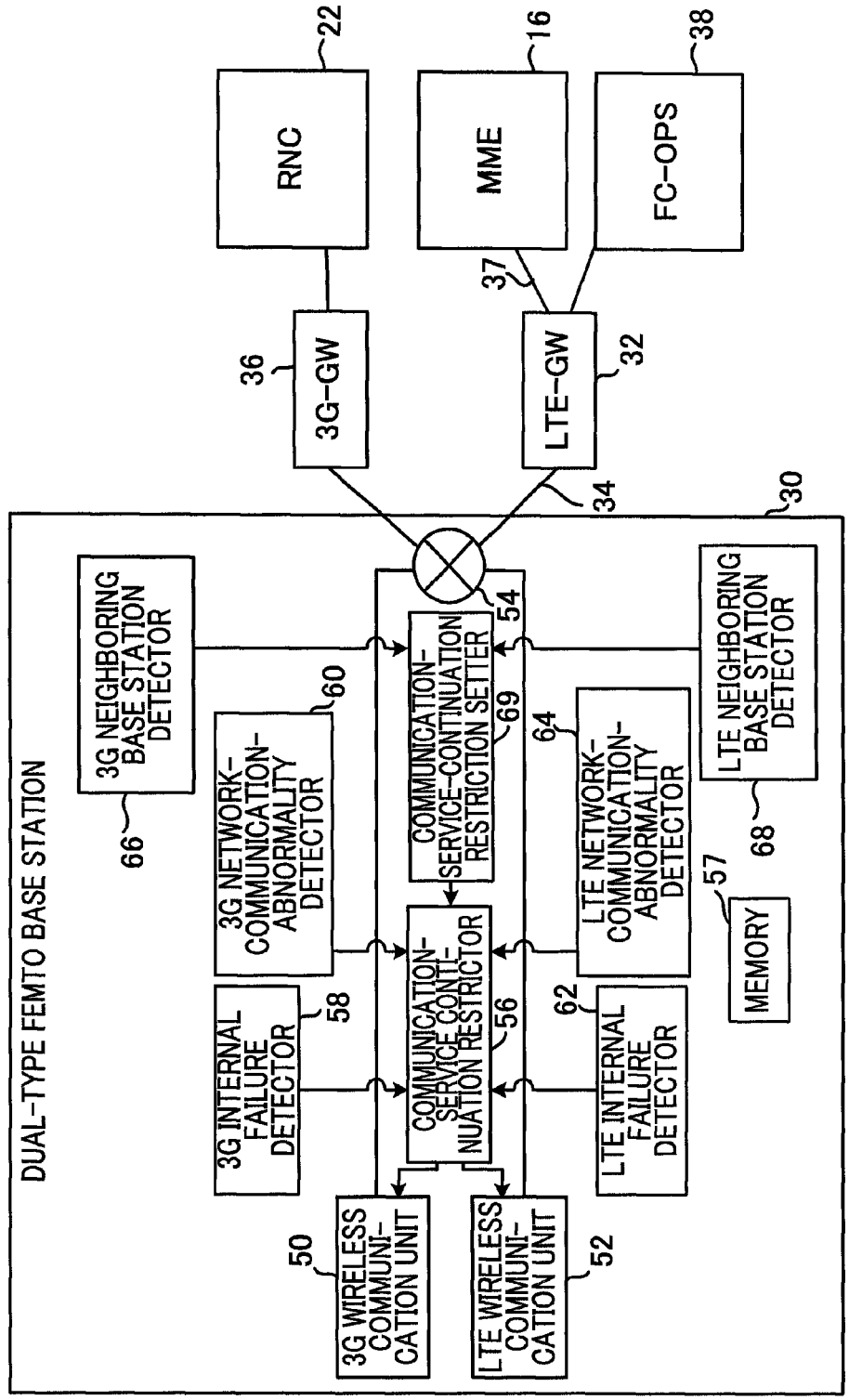
FIG. 4 is a block diagram showing a dual-type femto base station of a second embodiment of according to the present invention.

FIG. 4 is a block diagram showing dual-type femto base station 30 according to a second embodiment of the present invention. Femto base station 30 of the second embodiment differs from that of the first embodiment in that memory 57 does not have the service-continuation flag stored therein. When it is detected that a communication service by one of the radio access technologies is not executable, whether or not a communication service by the other radio access technology should be continued at communication-service continuation restrictor 56 depends on whether or not another base station near femto base station 30 is detected. In addition to the configuration of femto base station 30 of the first embodiment, femto base station 30 of the second embodiment is provided with a 3G neighboring base station detector (first neighboring base station detector) 66, an LTE neighboring base station detector (second neighboring base station detector) 68, and a communication-service-continuation restriction setter 69.

3G neighboring base station detector 66 detects another base station (typically, 3G macro base station 20) that communicates with mobile stations by the 3G radio access technology and is near femto base station 30. The 3G neighboring base station detector 66 is provided with a receiving circuit that receives radiowaves of a specific frequency transmitted from another base station that communicates with mobile stations by the 3G radio access technology, a measurement circuit that measures power of the radiowaves received by the receiving circuit, and a determination unit that determines whether the power measured by the measurement circuit exceeds a threshold. That the determination unit determines that the power measured by the measurement circuit exceeds the threshold means that another base station is detected that is near femto base station 30 and that communicates with mobile stations by the 3G radio access technology. The determination unit can be a functional block that is actualized by the processor of femto base station 30 functioning in accordance with a computer program stored in memory 57.

LTE neighboring base station detector 68 detects another base station (typically, LTE macro base station 10) that is near femto base station 30 and that communicates with mobile stations by the LTE radio access technology. LTE neighboring base station detector 68 is provided with a receiving circuit that receives radiowaves of a specific frequency transmitted from another base station that communicates with mobile stations by the LTE radio access technology, a measurement circuit that measures power of the radiowaves received by the receiving circuit, and a determination unit that determines whether the power measured by the measurement circuit exceeds a threshold. That the determination unit determines that the power measured by the measurement circuit exceeds the threshold means that another base station is detected that is near femto base station 30 and that communicates with mobile stations by the LTE radio access technology. The determination unit can be a functional block that is actualized by the processor of femto base station 30 functioning in accordance with a computer program stored in memory 57.

Communication-service-continuation restriction setter 69 sets, based on search results of 3G neighboring base station detector 66 and LTE neighboring base station detector 68, operation of communication-service continuation restrictor 56, i.e., when it is detected that a communication service by one of the radio access technologies is not executable, whether or not a communication service by the other radio access technology should be continued. Specifically, when 3G neighboring base station detector 66 detects another base station that communicates with mobile stations by the 3G radio access technology, communication-service-continuation restriction setter 69 sets communication-service continuation restrictor 56 so that the communication service by the 3G radio access technology is not continued when LTE internal failure detector 58 or LTE network-communication-abnormality detector 64 detects that the communication service by the LTE radio access technology is not executable. When 3G neighboring base station detector 66 does not detect another base station that communicates with mobile stations by the 3G radio access technology, communication-service-continuation restriction setter 69 sets communication-service continuation restrictor 56 so as to continue the communication service by the 3G radio access technology when LTE internal failure detector 58 or LTE network-communication-abnormality detector 64 detects that the communication service by the LTE radio access technology is not executable. When LTE neighboring base station detector 68 detects another base station that communicates with mobile stations by the LTE radio access technology, communication-service-continuation restriction setter 69 sets communication-service continuation restrictor 56 so that the communication service by the LTE radio access technology is not continued when the 3G internal failure detector or 3G network-communication-abnormality detector 60 detects that the communication service by the 3G radio access technology is not executable; and when LTE neighboring base station detector 68 does not detect another base station that communicates with mobile stations by the LTE radio access technology, communication-service-continuation restriction setter 69 sets communication-service continuation restrictor 56 so as to continue the communication service by the LTE radio access technology when 3G internal failure detector or 3G network-communication-abnormality detector 60 detects that communication service by the 3G radio access technology is not executable.

In this embodiment, when a communication service by one of the radio access technologies is not executable at femto base station 30, if there is a neighboring base station using the other radio access technology that can still be used at the same femto base station 30, the still usable communication service by the other radio access technology is stopped. On the other hand, when it is detected that a communication service by one of the radio access technologies is not executable at femto base station 30, if there is no neighboring base station using the other radio access technology that can still be used at femto base station 30, the usable communication service by the other radio access technology is caused to be continued. More specifically, if there is a neighboring base station (typically, 3G macro base station 20) using the 3G radio access technology, when it is detected that the communication service by the LTE radio access technology is not executable at femto base station 30, the still usable communication service by the 3G radio access technology is stopped. Because mobile stations that can use the 3G radio access technology use another neighboring base station (typically, 3G macro base station 20) using the 3G radio access technology, no significant problem will be caused even if the communication service by the 3G radio access technology at femto base station 30 is stopped. On the other hand, if there is no neighboring base station using the 3G radio access technology, when it is detected that the communication service by the LTE radio access technology is not executable at femto base station 30, the usable communication service by the 3G radio access technology is caused to be continued. That is, for mobile stations using the 3G radio access technology, the communication service by the 3G radio access technology femto base station 30 is caused to be continued.

Also, if there is a neighboring base station (typically, LTE macro base station 10) using the LTE radio access technology, when it is detected that the communication service by the 3G radio access technology is not executable at femto base station 30, the still usable communication service by the LTE radio access technology is stopped. Because mobile stations that can use the LTE radio access technology use another neighboring base station (typically, LTE macro base station 10) using the LTE radio access technology, no significant problem will be caused even if the communication service by the LTE radio access technology at femto base station 30 is stopped. On the other hand, if there is no neighboring base station using the LTE radio access technology, when it is detected that the communication service by the 3G radio access technology is not executable at femto base station 30, the usable communication service by the LTE radio access technology is caused to be continued. That is, for mobile stations using the LTE radio access technology, the communication service by the LTE radio access technology femto base station 30 is caused to be continued.

3G neighboring base station detector 66 and LTE neighboring base station detector 68 conduct searches for neighboring base stations at the time of activating femto base station 30 and at certain time intervals. Every time search is conducted at 3G neighboring base station detector 66 and LTE neighboring base station detector 68, communication-service-continuation restriction setter 69, based on search results of 3G neighboring base station detector 66 and LTE neighboring base station detector 68, sets operation of communication-service continuation restrictor 56. Accordingly, when it is detected that a communication service by one of the radio access technologies is not executable, whether or not a communication service by the other radio access technology should be continued can be set automatically and regularly. For example, even when a neighboring base station is newly established or abolished, operation of communication-service continuation restrictor 56 can be set automatically and regularly.

Third Embodiment

Figure 5:
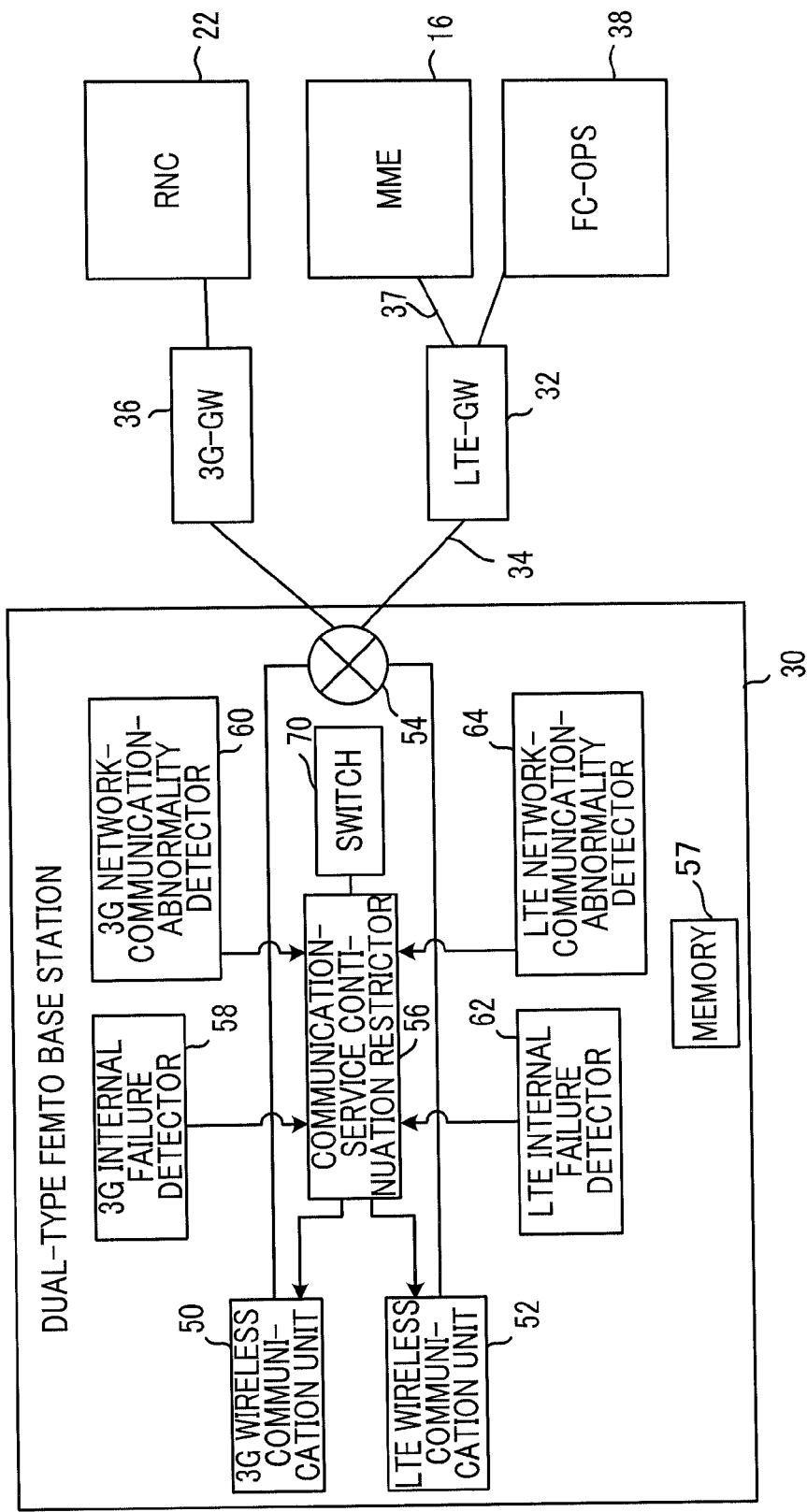
FIG. 5 is a block diagram showing a dual-type femto base station of a third embodiment of according to the present invention.

FIG. 5 is a block diagram showing dual-type femto base station 30 according to the third embodiment of the present invention. Femto base station 30 of the third embodiment differs from that of the first embodiment in that memory 57 does not have the service-continuation flag stored therein. When it is detected that a communication service by one of the radio access technologies is not executable, whether or not a communication service by the other radio access technology should be continued at communication-service continuation restrictor 56 depends on the setting of switch 70 provided at femto base station 30.

In addition to the configuration of femto base station 30 of the first embodiment, femto base station 30 of the third embodiment has a service-continuation switch 70. Switch 70 is a manual switch handled by an operator. If switch 70 is ON, when it is detected that a communication service by one of the radio access technologies is not executable, communication-service continuation restrictor 56 continues a communication service by the other radio access technology. If switch 70 is OFF, when it is detected that a communication service by one of the radio access technologies is not executable, communication-service continuation restrictor 56 controls operation of femto base station 30 so that a communication service by the other radio access technology is stopped. Thus, switch 70 is used in a likely manner as the service-continuation flag of the first embodiment. When a communication service by one radio access technology becomes not executable, whether or not to continue a service by the other radio access technology at the base station can be adequately set depending on, for example, the environments of femto base station 30, performance required for a communication system including femto base station 30, the policy of an operator of the base station, or on other factors.

Like the service-continuation flag at the time of internal failure and the service-continuation flag at the time of network abnormality in one of the modifications of the first embodiment, a service-continuation switch at the time of internal failure and a service-continuation switch at the time of network abnormality may be provided. Like the LTE service-continuation flag at the time of 3G malfunctioning and the 3G service-continuation flag at the time of LTE malfunctioning in another of the modifications of the first embodiment, an LTE service-continuation switch at the time of 3G malfunctioning and a 3G service-continuation switch at the time of LTE malfunctioning may be provided. Furthermore, like the LTE service-continuation flag at the time of 3G internal failure, the 3G service-continuation flag at the time of LTE internal failure, the LTE service-continuation flag at the time of 3G network abnormality, and the 3G service-continuation flag at the time of LTE network abnormality in another of the modifications of the first embodiment, an LTE service-continuation switch at the time of 3G internal failure, a 3G service-continuation switch at the time of LTE internal failure, an LTE service-continuation switch at the time of 3G network abnormality, and a 3G service-continuation switch at the time of LTE network abnormality may be provided.

Fourth Embodiment

Figure 6:
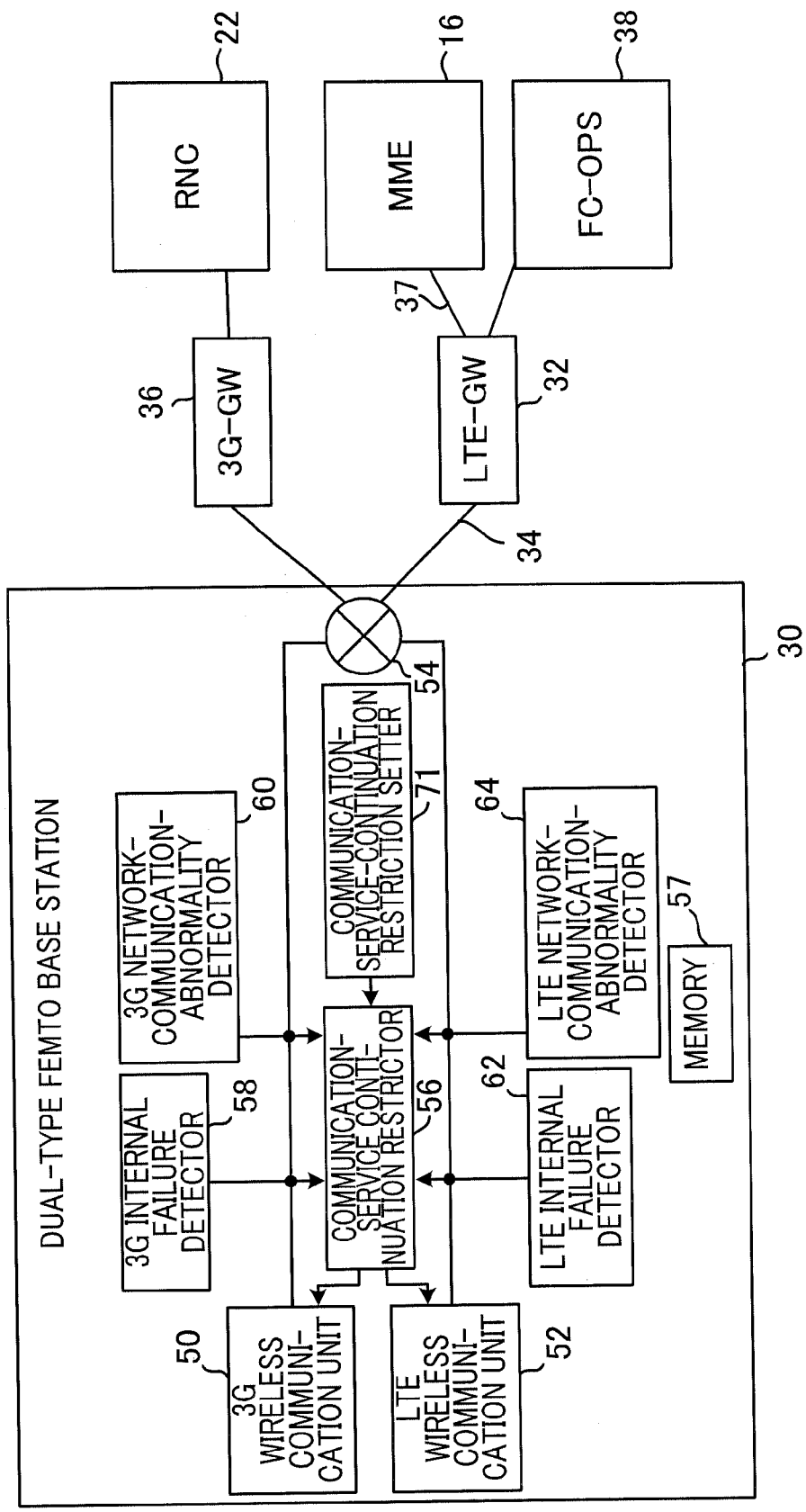
FIG. 6 is a block diagram showing a dual-type femto base station of a fourth embodiment of according to the present invention.

FIG. 6 is a block diagram showing dual-type femto base station 30 according to the fourth embodiment of the present invention. Femto base station 30 of the fourth embodiment differs from that of the first embodiment in that memory 57 does not have the service-continuation flag stored therein. When it is detected that a communication service by one of the radio access technologies is not executable, whether or not a communication service by the other radio access technology should be continued at communication-service continuation restrictor 56 depends on restriction information received from another device in the communication system.

In addition to the configuration of femto base station 30 of the first embodiment, femto base station 30 of the fourth embodiment has a communication service-continuation restriction setter 71. Communication-service-continuation restriction setter 71, sets, in accordance with restriction information received from another device in the communication system, communication-service continuation restrictor 56 as to whether or not, when it is detected that a communication service by one of the radio access technologies is not executable, a communication service by the other radio access technology should be continued.

In the 3G network (first network), a device that transmits restriction information to femto base station 30 is called a "first device". The first device may be 3G-GW 36 or RNC 22. In the following description, the first device is 3G-GW 36. In the LTE network (second network), a device that transmits restriction information to femto base station 30 is called a "second device". The second device may be LTE-GW 32 or MME 16. In the following description, the second device is LTE-GW 32.

Figure 7:
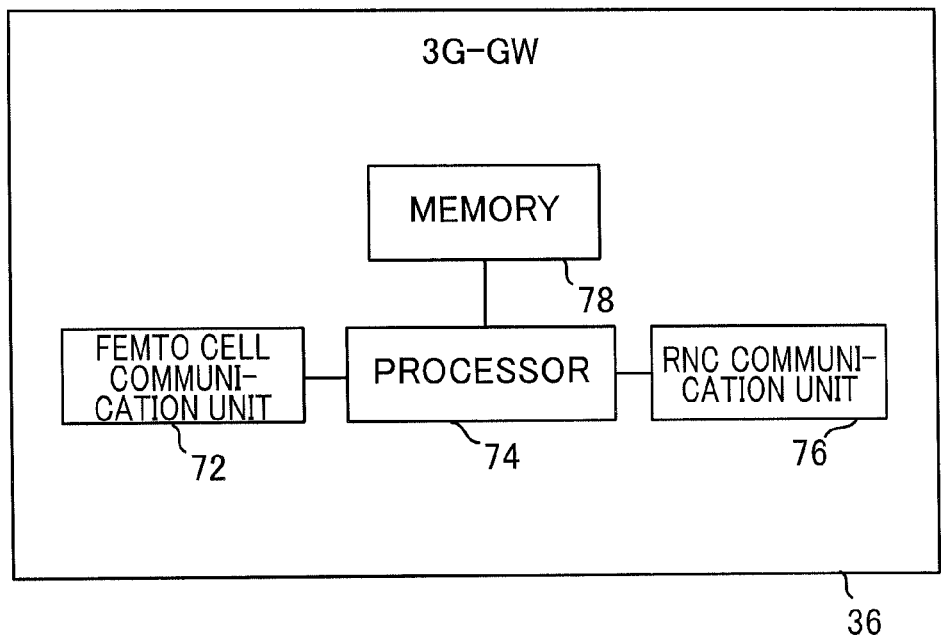
FIG. 7 is a block diagram showing a 3G gateway of a fourth embodiment of according to the present invention.

FIG. 7 is a block diagram showing 3G-GW 36, which acts as the first device. The 3G-GW 36 has a femto cell communication unit (transmitter) 72, a processor 74, an RNC communication unit 76, and a memory (storage unit) 78. Femto cell communication unit 72 is a communication interface that communicates with femto base station 30 under control of processor 74; and RNC communication unit 76 is a communication interface that communicates with RNC 22 under control of processor 74. Memory 78 has stored therein restriction information as well as a computer program executed by processor 74. Restriction information indicates, when the communication service by the LTE radio access technology is not executable at femto base station 30, whether or not the communication service by the 3G radio access technology at femto base station 30 should be continued.

Figure 8:
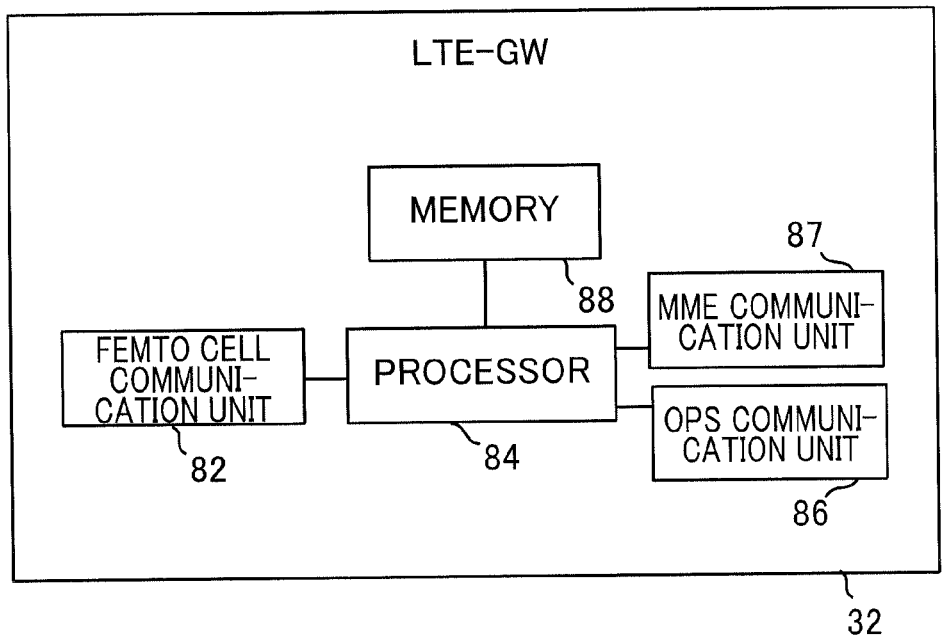
FIG. 8 is a block diagram showing an LTE gateway of the fourth embodiment of according to the present invention.

FIG. 8 is a block diagram showing LTE-GW 32, which acts as the second device. LTE-GW 32 has a femto cell communication unit (transmitter) 82, a processor 84, an OPS communication unit 86, an MME communication unit 87, and a memory (storage unit) 88. Femto cell communication unit 82 is a communication interface that communicates with femto base station 30 under control of processor 84; OPS communication unit 86 is a communication interface that communicates with FC-OPS38 under control of processor 84; and MME communication unit 87 is a communication interface that communicates with MME 16 under control of processor 84. Memory 88 has stored therein restriction information as well as a computer program executed by processor 84. Restriction information indicates, when the communication service by the 3G radio access technology is not executable at femto base station 30, whether or not the communication service by the LTE radio access technology at femto base station 30 should be continued.

When the communication service by the 3G radio access technology is not executable at femto base station 30, processor 84 of LTE-GW 32 reads out restriction information stored in memory 88, to transmit the restriction information via femto cell communication unit 82 to femto base station 30. For example, when, at femto base station 30, 3G internal failure detector 58 detects a failure of the 3G radio access technology function, i.e., a malfunction of 3G wireless communication unit 50, or when 3G network-communication-abnormality detector 60 detects an abnormality of communication between a device in the 3G network and femto base station 30, femto base station 30 transmits a 3G communication abnormality report to LTE-GW 32, and the LTE-GW 32, when it receives the 3G communication abnormality report, replies to femto base station 30 with restriction information.

When the communication service by the LTE radio access technology is not executable at femto base station 30, processor 74 of 3G-GW 36 reads out restriction information stored in memory 78, to transmit the restriction information via femto cell communication unit 72 to femto base station 30. For example, when, at femto base station 30, LTE internal failure detector 62 detects a failure of the LTE radio access technology function, i.e., a malfunction of LTE wireless communication unit 52, or when LTE network-communication-abnormality detector 64 detects an abnormality of communication between a device in the LTE network and femto base station 30, femto base station 30 transmits an LTE communication abnormality report to 3G-GW 36, and the 3G-GW 36, when it receives the LTE communication abnormality report, replies to femto base station 30 with restriction information.

In another embodiment, an information exchange path may be provided between LTE-GW 32 and 3G-GW 36, or an information exchange path may be provided between RNC 22 and MME 16, so that information about a communication status of femto base station 30 may be exchanged between the 3G network (first network) and the LTE network (second network). Specifically, when the device in the 3G network detects that communication between the 3G network and femto base station 30 is not executable, the device in the 3G network may transmit a 3 G communication abnormality report to the device in the LTE network. Upon receiving the 3 G communication abnormality report, LTE-GW 32 transmits restriction information to femto base station 30. Also, when the device in the LTE network detects that communication between the LTE network and the femto base station 30 is not executable, the device in the LTE network may transmit an LTE communication abnormality report to the device in the 3G network. Upon receiving the LTE communication abnormality report, 3G-GW 36 transmits restriction information to femto base station 30.

In either case, at femto base station 30, communication-service-continuation restriction setter 71 sets, in accordance with the received restriction information, communication-service continuation restrictor 56 as to whether or not the communication service by the still usable radio access technology should be continued. Thus, whether or not the communication service by the other radio access technology should be continued at femto base station 30 can be controlled by restriction information by a device other than femto base station 30. Restriction information may be in a format called a "flag" or may be in a format called a "system parameter".

Restriction information is used in a likely manner as the service-continuation flag of the first embodiment. When a communication service by one radio access technology becomes not executable, whether or not to continue a service by the other radio access technology at the base station can be adequately set depending on, for example, the environments of femto base station 30, performance required for a communication system including femto base station 30, the policy of an operator of the base station, or on other factors.

Like the service-continuation flag at the time of internal failure and the service-continuation flag at the time of network abnormality in one of the modifications of the first embodiment, the restriction information may include an information element defining whether a service should be continued at the time of internal failure and an information element defining whether a service should be continued at the time of network abnormality. An instruction indicated by the restriction information received from the first device and an instruction indicated by the restriction information received from the second device may be the same or different from each other. For example, it may be configured so that when a service by the 3G radio access technology becomes not executable, a service by the LTE radio access technology is continued, but that when a service by the LTE radio access technology becomes not executable, a service by the 3G radio access technology is stopped.

Other Modifications

In the above embodiments, when it is detected that a communication service by one of the radio access technologies is not executable at dual-type femto base station 30, whether or not a communication service by the other radio access technology should be continued is set. However, the present invention is not limited to the femto base station. For example, when it is detected that a communication service by one of the radio access technologies is not executable at a pico cell having a cell of about a few meters to a few tens of meters in radius or at a micro cell having a few tens of meters to a few hundreds of meters in radius, whether or not a communication service by the other radio access technology should be continued may be set.

Also, when a communication service by one of the radio access technologies is not executable at the dual-type macro base station, whether or not a communication service by the other radio access technology should be continued may be set. Specifically, in a case in which a small size base station that communicates with mobile stations by the 3G radio access technology is arranged within a cell of the dual-type macro base station, and when the communication service by the LTE radio access technology is not executable at this macro base station, the communication service by the 3G radio access technology at the macro base station may be stopped. In a case in which a small size base station that communicates with mobile stations by the 3G radio access technology is not arranged within a cell of the dual-type macro base station, and when the communication service by the LTE radio access technology is not executable at this macro base station, the communication service by the 3G radio access technology at this macro base station may be continued. In a case in which a small size base station that communicates with mobile stations by the LTE radio access technology is arranged within a cell of the dual-type macro base station, and when the communication service by the 3G radio access technology is not executable at this macro base station, the communication service by the LTE radio access technology at the macro base station may be stopped. In a case in which a small size base station that communicates with mobile stations by the LTE radio access technology is not arranged within a cell of the dual-type macro base station, and when the communication service by the 3G radio access technology is not executable at this macro base station, the communication service by the LTE radio access technology at this macro base station may be continued.

The above embodiments relate to the 3G and LTE radio access technologies. However, the present invention can be applied to a base station using differing radio access technologies, for example, to a base station that communicates with mobile stations using both second generation (2G) and 3G radio access technologies, or to a base station that communicates with mobile stations using both 2G and LTE radio access technologies. Also, the present invention may be applied to a base station that communicates with mobile stations using both W-CDMA (Wideband Code Division Multiple Access) and CDMA 2000 radio access technologies of 3G.

Additionally, the present invention can be applied not only to a base station that can use different multiple radio access technologies but to a base station that communicates with mobile stations by the same radio access technology, but with different frequency bands. In short, the present invention can be applied to a base station that can provide multiple radio communication services with mobile stations. For example, it is contemplated that when more than one frequency bands by the LTE radio access technology are used, one of frequency bands is used for data communication between mobile stations and a base station, and another of the frequency bands is used for voice call communication between mobile stations and the base station. At a base station that can process all these frequency bands, it depends on the policy of an operator whether or not, when the processing of one of the frequency bands becomes not executable, a radio communication service by another frequency band should be continued or stopped. An operator may think that, if one communication service (for example, one of the voice call communication service and the data communication service) is not executable due to the processing of one of the frequency bands being not executable, stopping a communication service by another frequency band (for example, the other of the voice call communication service and the data communication service) is preferable because users would not be confused.

Such a base station has, for example, a first abnormality detector that detects that one of the voice call communication service and the data communication service is not executable and a second abnormality detector that detects that the other of the voice call communication service and the data communication service is not executable. Specifically, each of the abnormality detectors detects that communication by a frequency band used for the voice call or data communication is not executable. Such a base station is additionally provided with a communication service continuation restrictor that, when that either one of the radio communication services not being executable is detected at either one of the abnormality detectors, restricts operation of the base station as to whether the other radio communication service should be continued, whereby whether the other radio communication service should be continued can be set at the communication service continuation restrictor. Such a base station can respond to any of the above-described demands of an operator. The features and modifications described above with respect to the first to the fourth embodiments may be applied to this modification as long as such application does not cause a conflict. In this specification, the "radio communication service" sometimes means radio access technology, and even the same term, radio access technology, sometimes means a frequency band and at other times means a service distinguished by a type of service provided.

Furthermore, the present invention may be applied to a case in which, at a base station that can provide three or more radio communication services, one of the radio communication services becomes so that it cannot be provided. For example, for a base station that uses 2G, 3G, and LTE radio access technologies, when a communication service by one of the radio access technologies becomes not executable, it may be set whether or not all of communication services by the other two radio access technologies should be continued or stopped. Alternatively, whether or not each of the communication services by the other two radio access technologies should be continued or stopped may be set separately. As another example, for a base station that uses W-CDMA, CDMA2000, and LTE radio access technologies, when a communication service by one of the radio access technologies becomes not executable, it may be set whether or not all of communication services by the other two radio access technologies should be continued or stopped. Alternatively, whether or not each of the communication services by the other two radio access technologies should to be continued or stopped may be set separately. As still another example, for a base station that uses 3G and LTE radio access technologies and multiple frequency bands of LTE (where different types of services are allocated), when a communication service by one of the radio access technologies becomes not executable, it may be set whether or not all of communication services by the other two radio access technologies should be continued or stopped. Alternatively, whether or not each of the communication services by the other two radio access technologies should be continued or stopped may be set separately.

At the base station, the first device, and the second device, each function executed by the processor may be executed, instead of by the processor, by hardware or by a programmable logic device such as FPGA (Field Programmable Gate Array), DSP (Digital Signal Processor), etc.

REFERENCE SYMBOLS

1 LTE dedicated mobile station,
2 3G dedicated mobile station,
3 dual-type mobile station,
10 LTE macro base station,
16 MME (Mobility Management Entity),
20 3G macro base station,
22 RNC (Radio Network Controller),
30 dual-type femto base station,
32 LTE gateway (LTE-GW),
36 3G gateway (3G-GW),
38 FC-OPS (femto cell operation system),
50 3G wireless communication unit (first wireless communication unit),
52 LTE wireless communication unit (second wireless communication unit),
54 integrated communication controller,
56 communication-service continuation restrictor,
57 memory,
58 3G internal failure detector (first abnormality detector, the first internal failure detector),
60 3G network-communication-abnormality detector (first abnormality detector, the first network-communication-abnormality detector),
62 LTE internal failure detector (second abnormality detector, the second internal failure detector),
64 LTE network-communication-abnormality detector (second abnormality detector, the second network-communication-abnormality detector),
66 3G neighboring base station detector (first neighboring base station detector),
68 LTE neighboring base station detector (second neighboring base station detector),
69 communication-service-continuation restriction setter,
70 switch,
71 communication-service-continuation restriction setter,
72 femto cell communication unit (transmitter),
74 processor,
76 RNC communication unit,
78 memory (storage unit),
82 femto cell communication unit (transmitter),
84 processor,
86 OPS communication unit,
87 MME communication unit,
88 memory (storage unit).

What is claimed is:
1. A base station comprising circuitry configured to:
communicate with mobile stations for offering a first radio communication service to the mobile stations;
communicate with mobile stations for offering a second radio communication service that is different from and is alternative to the first radio communication service to the mobile stations or other mobile stations;
detect that the first radio communication service becomes not executable;

detect that the second radio communication service becomes not executable; and
restrict, when it is detected that either one of the first and second radio communication services becomes not executable, operation of the base station such that the other one of the first and second radio communication services is discontinued,
wherein it is settable that the other one of the first and second radio communication services should be discontinued.

2. The base station of claim 1, wherein the circuitry is further configured to:
detect a failure of a function for the first radio communication service within the base station;
detect an abnormality of communication between the base station and a device in a first network that communicates with the base station when the base station communicates with the mobile stations for offering the first radio communication service to the mobile stations;
detect a failure of a function for the second radio communication service within the base station; and
detect an abnormality of communication between the base station and a device in a second network that communicates with the base station when the base station communicates with the mobile stations for offering the second radio communication service to the mobile stations,
wherein the circuitry is further configured to restrict, when a failure of a function for one of the first and second radio communication services is detected, operation of the base station such that the other one of the first and second radio communication services is discontinued, and it is settable that the other one of the first and second radio communication services should be discontinued if a failure of a function for the first or second radio communication service has been detected, and
wherein the circuitry is further configured to restrict, when an abnormality of communication between the base station and the device in one of the first and second networks, which communicates with the base station when the base station communicates with the mobile stations for offering a corresponding one of the first and second radio communication services, is detected, operation of the base station such that the other one of the first and second radio communication services is discontinued, and it is settable that the other one of the first and second radio communication services should be discontinued if an abnormality of communication between the base station and the device in the first or second network has been detected.

3. The base station of claim 1, wherein the circuitry is further configured to:
communicate with mobile stations for offering a third radio communication service that is different from and is alternative to the first and second radio communication services to the mobile stations or other mobile stations;
detect that the third radio communication service becomes not executable; and
restrict, when it is detected that any one of the first, second, and third radio communication services becomes not executable, operation of the base station such that one or both of the other radio communication services is discontinued,
wherein it is settable that one or both of the other radio communication services should be discontinued.

4. A base station comprising circuitry configured to:
communicate with mobile stations for offering a first radio communication service to the mobile stations;
communicate with mobile stations for offering a second radio communication service that is different from the first radio communication service to the mobile stations or other mobile stations;
detect that the first radio communication service becomes not executable;
detect that the second radio communication service becomes not executable; and
restrict, when it is detected that either one of the first and second radio communication services becomes not executable, operation of the base station as to whether or not the other one of the first and second radio communication services should be continued,
wherein it is settable whether or not the other one of the first and second radio communication services should be continued,
wherein the circuitry is further configured to:
detect another base station located near the base station that communicates with mobile stations for offering the first radio communication service to the mobile stations; and
detect another base station located near the base station that communicates with mobile stations for offering the second radio communication service to the mobile stations,
wherein operation of the base station is restricted such that the first radio communication service is discontinued when another base station that communicates with mobile stations for offering the first radio communication service to the mobile stations has been detected, and when the second radio communication service has been detected to have become not executable,
wherein operation of the base station is restricted such that the first radio communication service is continued when another base station that communicates with mobile stations for offering the first radio communication service to the mobile stations has not been detected, and when the second radio communication service has been detected to have become not executable,
wherein operation of the base station is restricted such that the second radio communication service is discontinued when another base station that communicates with mobile stations for offering the second radio communication service to the mobile stations has been detected, and when the first radio communication service has been detected to have become not executable, and
wherein operation of the base station is restricted such that the second radio communication service is continued when another base station that communicates with mobile stations for offering the second radio communication service to the mobile stations has not been detected, and when the first radio communication service has been detected to have become not executable.

5. A communication system comprising:
a base station;
first circuitry in a first network that communicates with the base station when the base station communicates with mobile stations for offering the first radio communication service to the mobile stations; and second circuitry in a second network that communicates with the base station when the base station communicates with the mobile stations for offering the second radio communication service to the mobile stations,
wherein the base station comprises circuitry configured to:
communicate with mobile stations for offering a first radio communication service to the mobile stations;
communicate with mobile stations for offering a second radio communication service that is different from the first radio communication service to the mobile stations or other mobile stations;
detect that the first radio communication service becomes not executable;
detect that the second radio communication service becomes not executable; and
restrict, when it is detected that either one of the first and second radio communication services becomes not executable, operation of the base station as to whether or not the other one of the first and second radio communication services should be continued,
wherein it is settable whether or not the other one of the first and second radio communication services should be continued,
wherein each of the first circuitry and the second circuitry is configured to:
store restriction information indicating whether or not the base station should continue the other one of the first and second radio communication services; and
transmit the restriction information to the base station when either one of the first and second radio communication services becomes not executable in the base station, and
wherein operation of the base station is restricted as to whether or not the other one of the first and second radio communication services should be continued, in accordance with the restriction information.

* * * * *